(12) United States Patent
Nair

(10) Patent No.: US 10,832,300 B2
(45) Date of Patent: *Nov. 10, 2020

(54) METHOD, MEDIUM, AND SYSTEM FOR REDUCING COUNTERFEITS ONLINE

(71) Applicant: eBay Inc., San Jose, CA (US)

(72) Inventor: Ratish Madhavan Nair, San Jose, CA (US)

(73) Assignee: eBay Inc., San Jose, CA (US)

(*) Notice: Subject to any disclaimer, the term of this patent is extended or adjusted under 35 U.S.C. 154(b) by 174 days.

This patent is subject to a terminal disclaimer.

(21) Appl. No.: 16/162,367

(22) Filed: Oct. 16, 2018

(65) Prior Publication Data

US 2019/0050924 A1 Feb. 14, 2019

Related U.S. Application Data

(63) Continuation of application No. 14/962,399, filed on Dec. 8, 2015, now Pat. No. 10,127,589.

(51) Int. Cl.
*G06Q 30/00* (2012.01)
*G06Q 30/06* (2012.01)
(Continued)

(52) U.S. Cl.
CPC ..... *G06Q 30/0613* (2013.01); *G06F 16/5854* (2019.01); *G06K 9/46* (2013.01);
(Continued)

(58) Field of Classification Search
CPC .............. G06Q 30/0613; G06Q 30/018; G06F 17/30259; G06K 9/6267
See application file for complete search history.

(56) References Cited

U.S. PATENT DOCUMENTS 10,127,589 B2    11/2018   Nair
2010/0241528 A1*  9/2010   Hedges .............. G06Q 30/0601
                                                        705/26.1
(Continued)

OTHER PUBLICATIONS

Consumer Reports, "How to Spot Counterfeits", URL: https://www.consumerreports.org era 2012 06 how-to-spot-counterfeitsindex.html, (Accessed on Dec. 29, 2018,), 2 pages. (Year: 2012).*

(Continued)

*Primary Examiner* — Matthew E Zimmerman
(74) *Attorney, Agent, or Firm* — Schwegman Lundberg & Woessner, P.A.

(57) ABSTRACT

Systems and methods change a user interface for the purpose of guiding a user in supplementing a product listing with an image to evidence the product's authenticity. Example embodiments include a machine-implemented method for accessing at least one database to retrieve an authenticity criterion mapped to a product and at least one reference image that depicts adequate detail of a product specimen to fulfill the authenticity criterion. The machine can further cause a user device to display the reference image to the user along with a suggestion that the user submit a candidate image depicting similar detail of the product. In some example embodiments, the method further includes retrieving the candidate image, confirming receipt of the candidate image, and displaying the candidate image, as well as adjusting a rank for a candidate specimen based on various factors.

18 Claims, 10 Drawing Sheets

(51) Int. Cl.
*G06F 16/583* (2019.01)
*G06K 9/62* (2006.01)
*G06K 9/46* (2006.01)

(52) U.S. Cl.
CPC ......... *G06K 9/6201* (2013.01); *G06K 9/6267* (2013.01); *G06Q 30/018* (2013.01)

(56) References Cited

U.S. PATENT DOCUMENTS

| | | | |
|---|---|---|---|
| 2011/0119293 A1* | 5/2011 | Taylor | G06F 21/10 707/769 |
| 2014/0143090 A1* | 5/2014 | Deyle | G06Q 30/0609 705/26.35 |
| 2014/0279613 A1* | 9/2014 | Lee | G06Q 30/0185 705/318 |
| 2016/0292757 A1* | 10/2016 | Bandara | G06Q 30/0278 |
| 2017/0161810 A1 | 6/2017 | Nair | |

OTHER PUBLICATIONS

U.S. Appl. No. 14/962,399 U.S. Pat. No. 10,217,589, filed Dec. 8, 2015, Method, Medium, and System for Reducing Counterreits Online.

"U.S. Appl. No. 14/962,399, Notice of Allowance dated Jul. 12, 2018", 17 pgs.

"U.S. Appl. No. 14/962,399, Examiner Interview Summary dated Jul. 12, 2018", 1 pg.

Consumer Reports, ""How to Spot Counterfeits"", URL: https: www.consumerreports.org cro 2012 06 how-to-spot-counterfeits index.html, (Accessed on Dec. 29, 2018,), 2 pages.

\* cited by examiner

METHOD, MEDIUM, AND SYSTEM FOR REDUCING COUNTERFEITS ONLINE

CLAIM OF PRIORITY

This application is a Continuation of U.S. application Ser. No. 14/962,399, filed Dec. 8, 2015, which is hereby incorporated by reference in its entirety.

TECHNICAL FIELD

The subject matter disclosed herein generally relates to the technical field of special-purpose machines that provide guidance to users including computerized variants of such special-purpose machines and improvements to such variants, and to the technologies by which such special-purpose machines become improved compared to other special-purpose machines that provide guidance to users. Specifically, the present disclosure addresses a guided listing machine with authenticity support.

BACKGROUND

A machine may be configured to interact with one or more users by allowing the users to publish an offer of availability of one or more items over a network. The machine may be further configured to assist the users in procuring the items with previously published availability. The machine may further have access to and communicate with various databases, the databases containing information about the physical characteristics of various products.

Due to the potential vastness of availability and demand for specific items, procuring users generally desire to minimize their risk for procuring counterfeit items and may be more nervous about counterfeits when purchasing from individuals rather than large retail chains. The value of an item or the likelihood that a procuring user might desire to procure the item over similar items may rise if evidence attesting to the authenticity of an item is added.

BRIEF DESCRIPTION OF THE DRAWINGS

Some example embodiments are illustrated by way of example and not limitation in the figures of the accompanying drawings.

DETAILED DESCRIPTION

Figure 1:
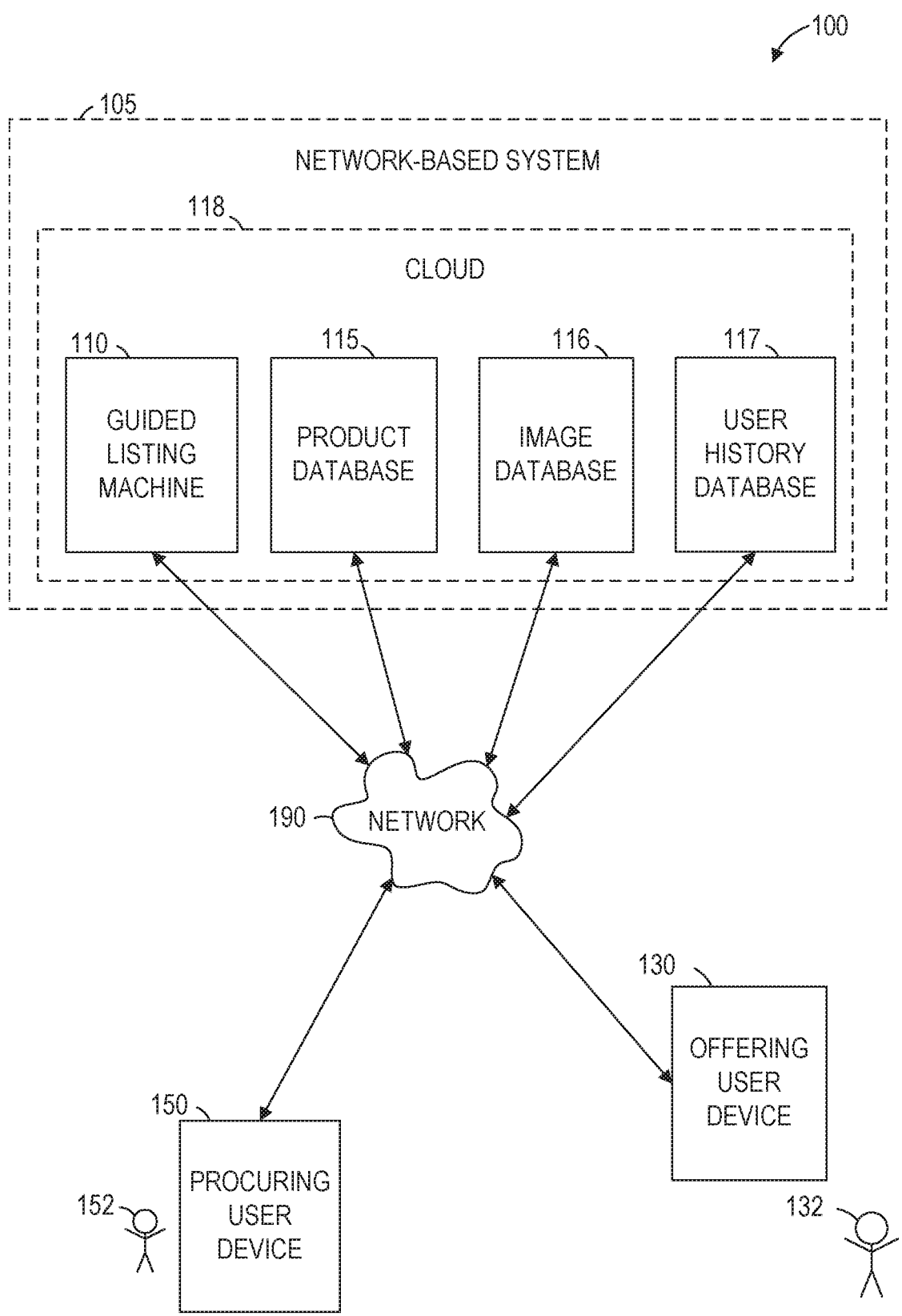
FIG. 1 is a network diagram illustrating a network environment suitable for a guided listing machine with authenticity support, according to some example embodiments.

Example methods (e.g., algorithms) facilitate a guided listing system with authenticity support, and example systems (e.g., special-purpose machines) are configured to facilitate guided listing with authenticity support. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In various example embodiments, a guided listing machine with authenticity support receives a request from a user to publish the availability of a specimen of a product, access a database that contains at least one authenticity criterion that can be mapped onto the product. The guided listing machine further retrieves at least one reference image that depicts the product and fulfills the authenticity criterion from an image database, generates an alert that contains the reference image and a suggestion that the user submit a candidate image that also fulfills the authenticity criterion, and presents the alert to the user.

In more detail, the guided listing machine receives a request to publish the availability of a candidate specimen of a product responsive to the user designating the product that they would like to offer. This may include receiving various information from the user, such as a product title, description, price, and even a product image. Based on this information, the user is able to designate the specific type of product that the user is trying to list. The user may further designate the product to be offered by selecting information from a list of product titles or images.

Next, the guided listing machine accesses a database that contains at least one authenticity criterion that is mapped to the product that is associated with the request. This database may contain one or more authenticity criteria that identify one or more reference details physically present in the product that attest to the product being an authentic version rather than a counterfeit or a completely different product.

The guided listing machine further accesses a database that contains at least one reference image that depicts a reference detail, the reference detail fulfilling the authenticity criterion mapped to the product. The reference image may depict the entire product or a portion of the product. In the event that the product has multiple reference details associated with one or more authenticity criteria, more than one image database may be accessed to receive reference images.

Next, the guided listing machine generates an alert, the alert containing at least one reference image depicting at least one reference detail that supports the authenticity of the product, and a suggestion that the user submit a candidate image that similarly depicts reference details depicted in the reference image. The suggestion can additionally include at least one benefit of uploading a candidate image.

After generating the alert, the guided listing machine causes the alert to be presented to the user. The alert may be presented on a the display of a user device. The alert may further include multiple options, such as an method of submitting the candidate image.

In other example embodiments, the guided listing machine may receive a candidate image from the user, display a confirmation that the image has been received successfully, and display the candidate image in the same window as the reference image.

In other example embodiments, the guided listing machine adjust a rank of the candidate specimen, the rank being adjusted based on one or more factors, such as: whether the user has uploaded a candidate image associated with the candidate image, whether the candidate specimen is part of a collection of items, whether the user has a history of uploading candidate images in response to suggestions, and whether the user has uploaded a candidate image that directly matches an image already contained in a database accessible by the guided listing machine. The guided listing machine may determine this direct match by locating a copy identifier within the data of a candidate image.

FIG. 1 is a network diagram illustrating a network environment 100 suitable for a guided listing system with authenticity support, according to some example embodiments. The network environment 100 includes a guided listing machine 110, a product database 115, an image database 116, a user history database 117, an offering user device 130, and a procuring user device 150, all communicatively coupled to each other via a network 190. The guided listing machine 110, with or without one or more of the databases 115, 116 or 117, may form all or part of a cloud 118 (e.g., a geographically distributed set of multiple machines configured to function as a single server), which may form all or part of a network-based system 105 (e.g., a cloud-based server system configured to provide one or more network-based services to the offering user device 130 and the procuring user device 150). The guided listing machine 110, the offering user device 130, and the procuring user device 150 may each be implemented in a special-purpose (e.g., specialized) computer system, in whole or in part, as described below with respect to FIG. 10.

The guided listing machine 110 guides a user in offering a product, the guiding including providing an example of a detail that fulfills an authenticity criterion and suggestion that the user submit a candidate image that fulfills the authenticity criterion. In an example embodiment, the guided listing machine 110 is capable of communications with the databases 115, 116, and 117 over the network 190 as well as communications with the offering user device 130 and the procuring user device 150 over the network 190.

For example, the product database 115 may communicate with the guided listing machine 110 by transmitting information about a reference detail in response to a request from the guided listing machine 110, the communications occurring over the network 190. The reference detail can include any characteristic that is visually apparent on a product, such as an embossed patch of leather with a brand logo on the handle of a handbag. The image database 116 and the user history database 117 may similarly communicate with guided listing machine 110 to provide communications (e.g., data transfer) of information, such as reference images, over the network 190. The offering user device 130 and the procuring user device 150 may further receive communications from any one or more of the databases 115, 116, or 117 as well as guided listing machine 110 over the network 190.

Also shown in FIG. 1 are an offering user 132 and a procuring user 152. One or both of the offering user 132 and the procuring user 152 may be a human user (e.g., a human being), a machine user (e.g., a computer configured by a software program to interact with the offering user device 130 or procuring user device 150), or any suitable combination thereof (e.g., a human assisted by a machine or a machine supervised by a human). The offering user 132 is associated with the offering user device 130 and may be a user of the offering user device 130. For example, the offering user device 130 may be a desktop computer, a vehicle computer, a tablet computer, a navigational device, a portable media device, a smart phone, or a wearable device (e.g., a smart watch, smart glasses, smart clothing, or smart jewelry) belonging to the offering user 132. Likewise, the procuring user 152 is associated with the procuring user device 150 and may be a user of the procuring user device 150. As an example, the procuring user device 150 may be a desktop computer, a vehicle computer, a tablet computer, a navigational device, a portable media device, a smart phone, or a wearable device (e.g., a smart watch, smart glasses, smart clothing, or smart jewelry) belonging to the procuring user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the guided listing machine 110 and the offering user device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
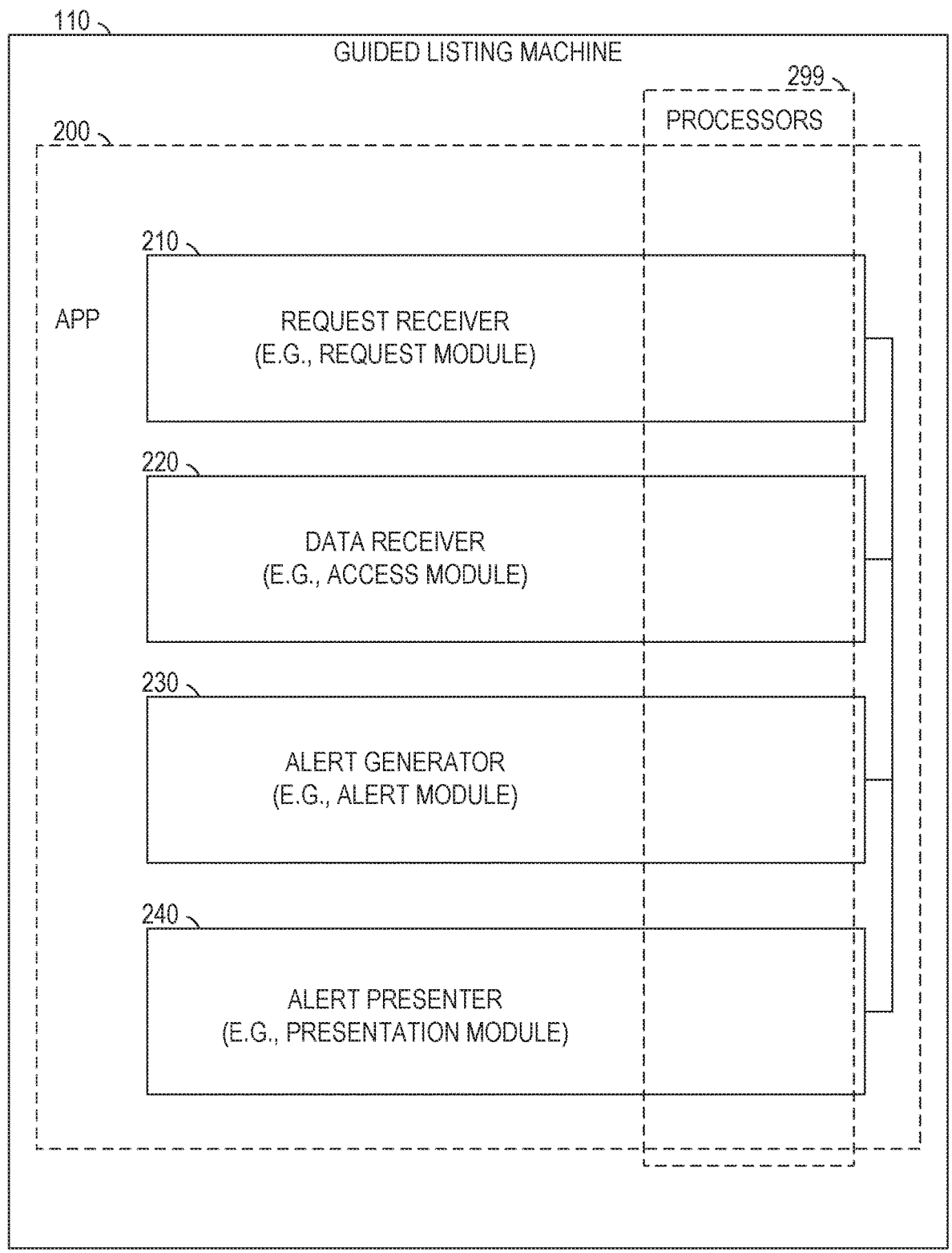
FIG. 2 is a block diagram illustrating components of a guided listing machine with authenticity support, according to some example embodiments.

FIG. 2 is a block diagram illustrating components of the guided listing machine 110, according to some example embodiments. The guided listing machine 110 is shown as including a request receiver 210, a data receiver 220, an alert generator 230, and an alert presenter 240, all configured to communicate with each other (e.g., via a bus, shared memory, or a switch).

As shown in FIG. 2, the request receiver 210, the data receiver 220, and the alert generator 230 may form all or part of an app 200 that is stored (e.g., installed) on the guided listing machine 110. Furthermore, one or more processors 299 (e.g., hardware processors, digital processors, or any suitable combination thereof) may be included (e.g., temporarily or permanently) in the app 200, request receiver 210, data receiver 220, alert generator 230, alert presenter 240, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices). The processors 299 may further communicate with one or more of the structural components detailed above, including the request receiver 210, the data receiver 220, the alert generator 230, and the alert presenter 240.

Figure 3:
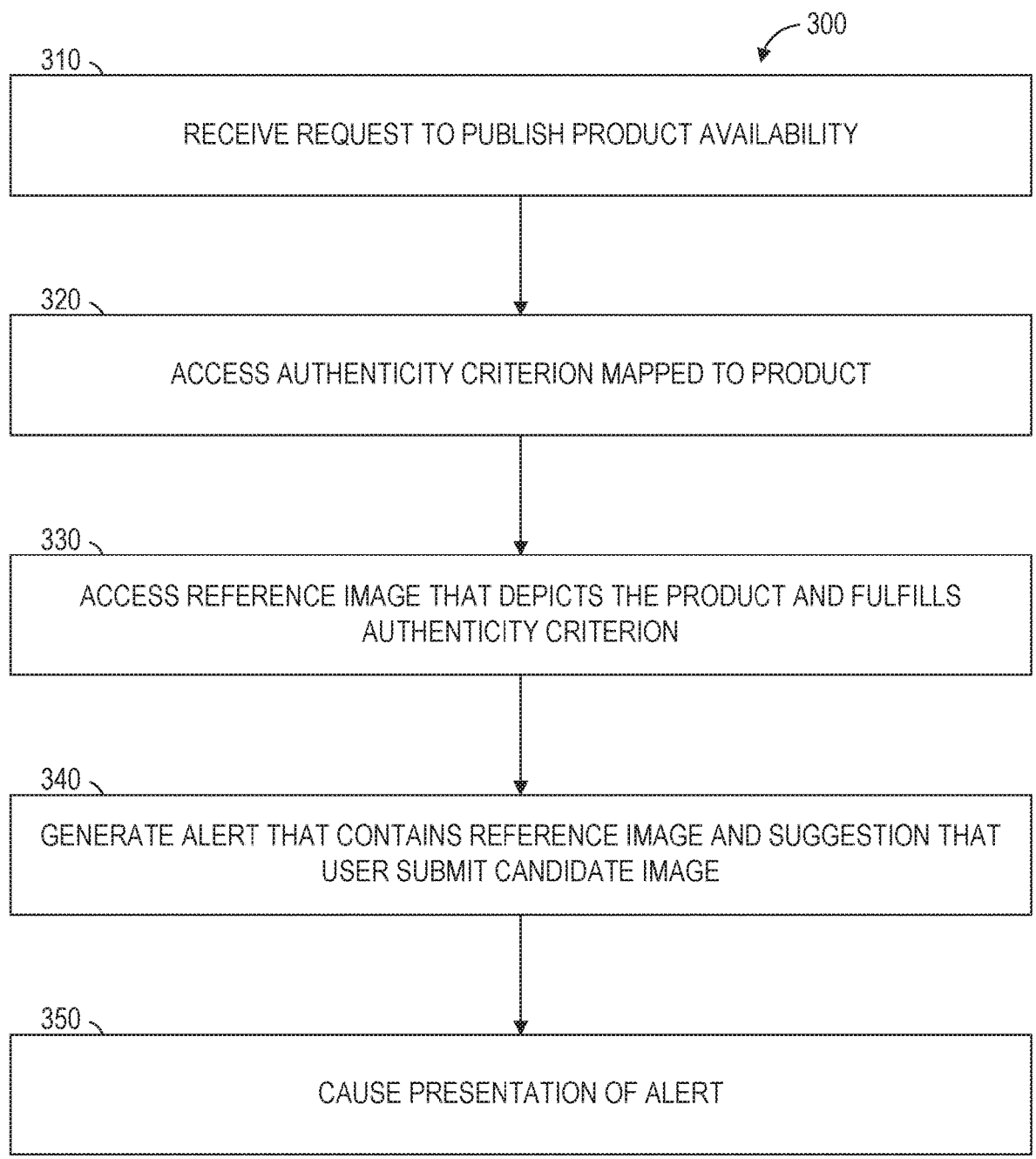
FIGS. 3-5 are flowcharts illustrating operations of the guided listing machine in performing a method of guiding a listing and providing authenticity support, according to some example embodiments.
Figure 4:
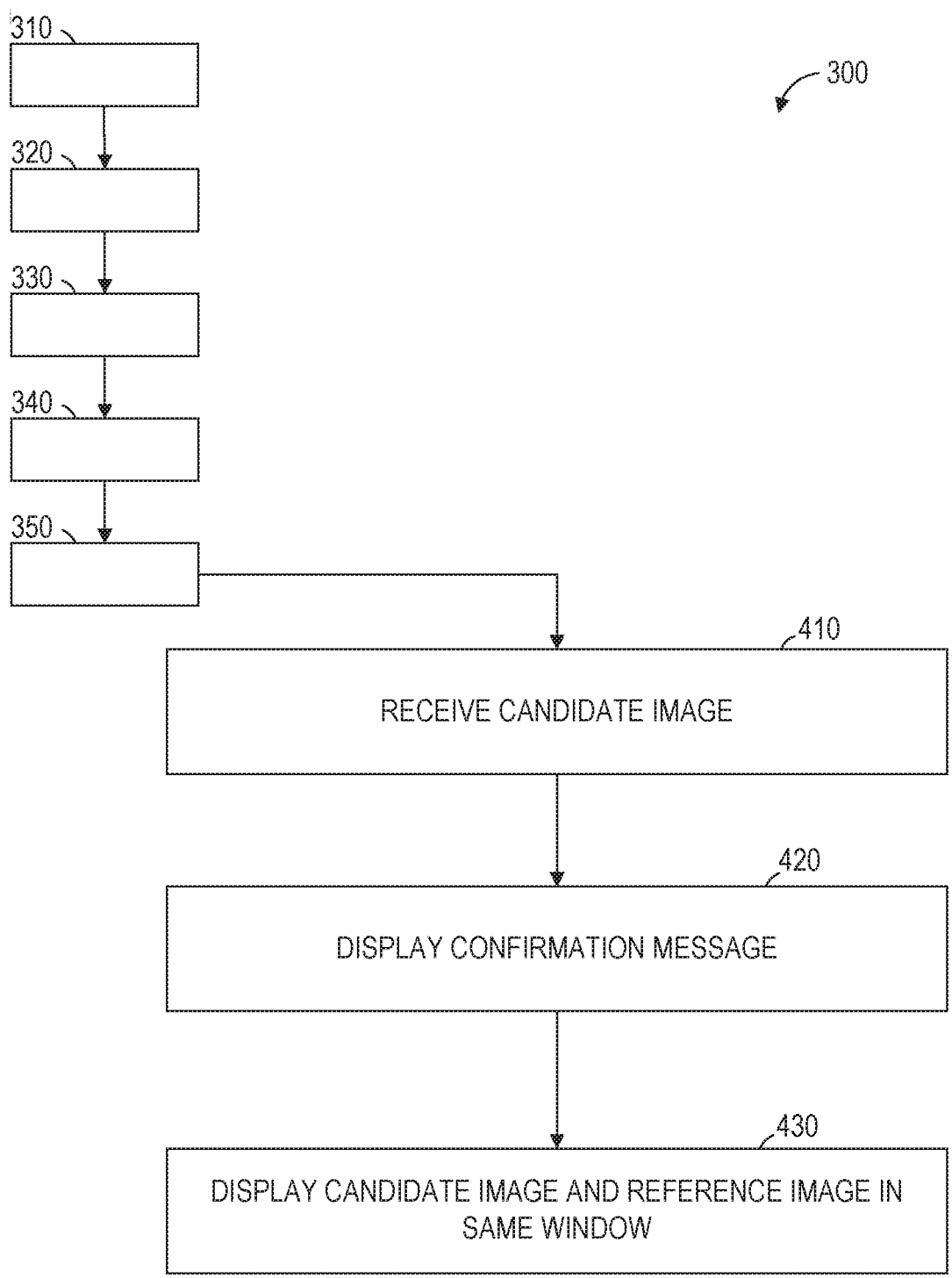
Figure 5:
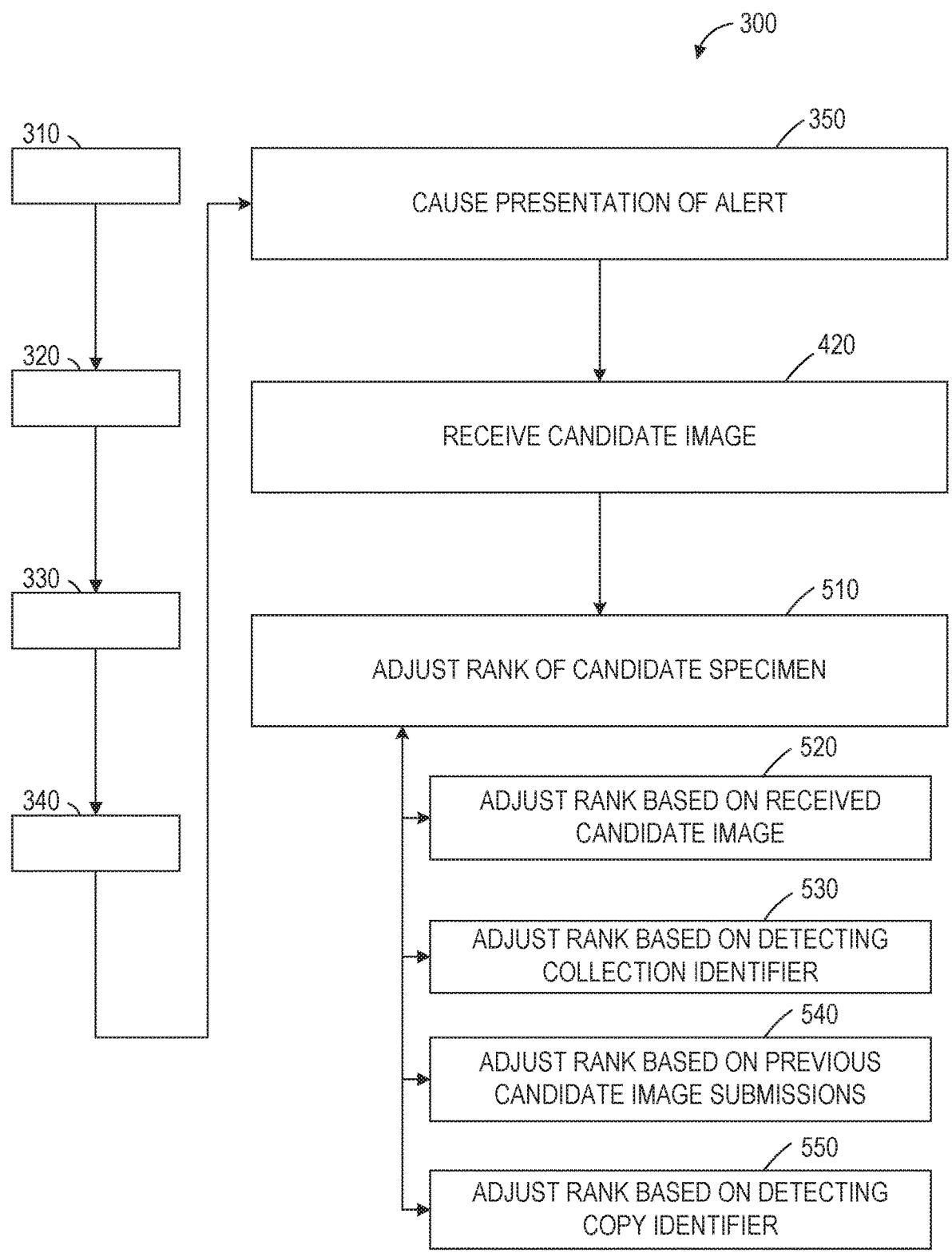

FIGS. 3-5 are flowcharts illustrating operations of the guided listing machine 110 in performing a method 300 of guiding a listing and providing authenticity support, according to some example embodiments. The guided listing machine 110 may include components (e.g., modules) described above with respect to FIG. 2, one or more processors (e.g., microprocessors or other hardware processors), or any suitable combination thereof. As shown in FIG. 3, the method 300 includes operations 310, 320, 330, 340, and 350.

In operation 310, the request receiver 210 receives a request to publish availability of a candidate specimen of a product, the request received from the offering user device 130 over a network. Various methods can be used to receive information from the offering user 132 and associate the information as related to a product. For example, the offering user 132 may submit one or more keywords related to a product, a title of the product, a picture of a product, or any suitable combination thereof. In another example embodiment, the offering user 132 may select the product from a list of products.

In an example embodiment, the offering user 132 desires to list "Bolt" running shoes that are part of the "Victory Collection" for sale. The offering user 132 submits a request to the app 200 to publish a listing of the product, the request made using a drop down menu with various products. In another embodiment, the offering user 132 inputs the title "Bolt: Victory Collection" in a text box, and the request receiver 220 matches the title to the product. In another example embodiment, the offering user 132 inputs the keywords "Bolt Shoe Victory" in a text box and the request receiver 220 presents various products related to the keywords. In another example embodiment, the offering user 132 inputs "Shoe" and then selects the title "Bolt: Victory Collection" from a drop down menu of products related to "Shoe."

In operation 320, the data receiver 220, responsive to the request receiver 210 receiving the request to publish availability of the product, accesses (e.g., retrieves) an authenticity criterion mapped to the product, the authenticity criterion describing a reference detail. The reference detail, as mentioned previously, is any characteristic that is visually apparent on a product. In some example embodiments, the authenticity criterion is accessed from the product database 115. In alternative example embodiments, the data receiver 220 may access the authenticity criterion from a database outside the network-based system 105 over the network 190. More than one authenticity criterion may be mapped to the product.

An authenticity criterion includes a rule that any specimen of a particular product exhibits a reference detail, such as a particular physical detail. The reference detail includes, but is not limited, to physical characteristics of a product that are visibly present. For example, an authenticity criterion for a brand of purse may indicate that all purses of this brand exhibit the reference detail of having gold, black, and blue thread stitching on the handle of the purse. Only purses that exhibit gold, black and blue stitching on their handles would fulfill this authenticity criterion. A similar purse having black, gold, and green thread stitching on the handle would not fulfill this criterion and may be a counterfeit product or an entirely different product altogether.

Continuing with the previous running shoe example, the request receiver 210 may collect data indicating that the offering user 132 desires to list a "Bolt: Victory Collection" running shoe for sale. The data receiver 220 may access a data structure such as the product database 115 and retrieve any authenticity criteria that are mapped to the "Bolt: Victory Collection" product, the authenticity criteria describing reference details that are visually apparent in an authentic specimen of the product. In this example, the data receiver 220 accesses and retrieves an authenticity criterion describing a particular pattern of toe stitching that all "Bolt: Victory Collection" products exhibit.

In operation 330, the data receiver 220, responsive to accessing the authenticity criterion, further accesses a reference image depicting at least a portion of a reference specimen of the product that exhibits the reference detail. The reference detail exhibited by the reference specimen is adequate to fulfill the authenticity criterion previously received. In some example embodiments the data receiver 220 can access the reference image within an image database 116, the image database 116 containing multiple images exhibiting reference details that fulfill authenticity criteria for multiple products. In alternative example embodiments, the data receiver 220 may access the candidate image from a database over the network 190, but outside the network-based system 105.

Continuing the above running shoe example, the data receiver 220 accesses the image database 116 and retrieve a reference image that depicts the toe stitching of the shoe reference detail. There may be multiple reference images depicting various parts of the "Bolt: Victory Collection" shoe within the image database 116. The data receiver 220 accesses the image database 220 and accesses a reference image that depicts the detail of the toe stitching. Additionally, the toe stitching reference detail depicted in the reference image fulfills the authenticity criterion.

In operation 340, the alert generator 230, responsive to the data receiver 220 accessing the reference image in operation 330, generates an alert containing both the reference image that depicts the reference detail as well as a suggestion that the offering user 132 submit the candidate image. The suggestion, when presented, notifies the offering user 132 that the candidate image should be a similar depiction of the product, in that the reference detail displayed in the reference image should be similar to a candidate detail displayed in the candidate image. In this way, the alert may prompt the offering user 132 to submit a candidate image displaying a candidate detail that fulfills the authenticity criterion, the candidate detail visually apparent on the candidate specimen that the offering user 132 desires to publish availability for.

Continuing the running shoe example, the alert generator 230 may pair the reference image of the "Bolt: Victory Collection" that depicts the toe stitching with a message that suggests that the offering user 132 submit a candidate image that depicts the toe region of the shoe the offering user 132 is trying to sell. For example, the alert generator 230 may generate language such as "It would be helpful for buyers if you add an image of the toe region of the product to show detail of the stitching."

In operation 350, the alert presenter 240, in response to the alert generator 230 generating an alert, presents the alert to the offering user 132. In an example embodiment, the alert presenter 240 communicates with the offering user device 130 to cause the offering user device 130 to present the alert to the offering user 132. In a further example embodiment, the alert presenter 240 may be configured to present the alert containing both the reference image and the suggestion to the offering user 132, such that the offering user 132 can view the reference image and the suggestion at the same time.

Continuing with the running shoe example, the alert presenter 240 communicates with the offering user device 130 and causes the offering user device 130 to present the alert to the offering user 132. Therefore, after submitting a request to publish availability of the "Bolt: Victory Collection" shoe, the offering user 132 may be presented with a suggestion that the offering user 132 upload a candidate image of the toe stitching on the shoe for sale, as well as a reference image depicting how the toe stitching should appear.

In some example embodiments, method 300 includes further operations, such as operations 410, 420, and 430 as displayed in FIG. 4. In operation 410, the data receiver 220, responsive to the alert presenter 240 presenting the offering user 132 with the alert containing the reference image and the suggestion, retrieves a candidate image from the offering user 132, the candidate image depicting a portion of the candidate specimen (the specimen of the product that the offering user 132 is listing) and the candidate detail that fulfills the authenticity criterion. In an example embodiment, the data receiver 220 causes the offering user device 130 to provide the offering user 132 with a user form to upload one or more candidate images to the guided listing machine 110 over the network 190. The data receiver 220 can store the one or more candidate images on a memory structure accessible by the guided listing machine 110, such as the image database 115.

In another example embodiment, the data receiver 220 provides the offering user 132 with a secure messaging service to submit one or more images. In another example embodiment, the data receiver 220 can operate in conjunction with the alert presenter 240 to provide the offering user 132 with the user form or the secure messaging service, particularly where the alert presenter 240 is configured to present messages to the offering user 132 on the offering user device 130.

In operation 420, the alert presenter 240, in response to the data receiver 220 retrieving a candidate image, displays a confirmation message to the offering user 132. The confirmation message may be displayed on the offering user device 130 and may contain language to inform the offering user 132 of a successful submission of one or more candidate image. Continuing the example above, in response to the offering user 132 submitting an image depicting the "Bolt: Victory Collection" shoe, the alert presenter 420 may cause a message to appear on the offering user device 130 reading: "Thank you for uploading a picture of the toe stitching."

In operation 430, alert presenter 240 can further display the reference image and at least one candidate image on the offering user device 130, the offering user device 130 displaying the reference image and the candidate image at the same time. For example, the offering user device 130 may have multiple bounded windows. The alert presenter 240 can communicate instructions to the offering user device 130, the instructions causing the offering user device 130 to display the reference image and the candidate image in the same bounded window. This method of display allows the offering user 132 the option to compare the reference detail to the candidate detail. The method 300 therefore allows the offering user 132 the ability to judge whether or not the candidate detail fulfills the authenticity criterion. Continuing with the running shoe example, the alert presenter 240 may present toe stitching on the reference image of the "Bolt: Victory Collection" shoe in the same window as the candidate image that the offering user 132 has uploaded.

In some example embodiments, the method 300 includes further operations, such as operations 510, 520, 530, 540, and 550 as displayed in FIG. 5. In operation 510, the network-based system 105, responsive to receiving one or more images uploaded by the offering user 132 in operation 410, adjusts a rank of a candidate specimen based on various factors, including factors described in operations 520, 530, 540, and 550. In adjusting the rank of a candidate specimen, the network-based system 105 may use various machines, data structures and processors connected to the network 190, such as the components of the guided listing machine 110.

The rank of a candidate specimen, as defined herein, is an ordering of product specimens that are available for procurement, the ordering being presentable to the procuring user 152. The ordering may further be viewable to the procuring user 152 in a list format on a device, such as the procuring user device 150.

In operation 520, the network-based system 105 adjusts the rank of a candidate specimen in response to receiving the candidate image from the offering user 132, as described in operation 420. In some example embodiments, the network-based system 105 adjusts the rank of the candidate specimen upward if the offering user 132 has submitted a candidate image.

Continuing with the running shoe example, the product availability published for the "Bolt: Victory Collection" shoe may be ranked higher if the product availability includes a candidate image that displays detail of the toe stitching. The network-based system 105 can order the listing for the candidate specimen in such a way that it is more likely to be viewed by the procuring user 152. The procuring user 152 may further be more likely to consider purchasing the shoe, not only because it is ranked higher, but because the procuring user 152 has the opportunity to view the candidate image and assess the authenticity of the candidate detail of the candidate specimen, in this case, the toe stitching.

In operation 520, the network-based system 105 can adjust the rank of the candidate specimen in response to the item being part of a collection. In some example embodiments, the network-based system 105 detects a collection identifier within the data of the product availability. The network-based system 105 can adjust the rank upward or downward based on a collection identifier depending on various factors, including the likelihood that counterfeit products from a collection are published as authentic products.

Continuing with the running shoe example, if the offering user 132 lists the "Bolt: Victory Collection" shoe as part of the "Victory Collection." The network-based system 105 detects a collection identifier associated with the listing and determines that the "Victory Collection" is a highly counterfeited collection. Since the offering user 132 has uploaded the candidate image at operation 420, the network-based system 105 may adjust the rank of the offering user's 132 listing upward because the candidate image helps verify a highly counterfeited item.

In operation 540, the network-based system 105 adjusts the rank of the candidate specimen in response to a record of the offering user's 132 history of uploading images. In some example embodiments, network-based system 105 accesses the user history database 117 to assess whether the offering user 132 that is publishing the availability of an item has a previous history of providing candidate images with item listings. The network-based system 105 may adjust the rank of a candidate specimen upward if the offering user 132 has a history of always including candidate images with items, indicating that the previous items are likely authentic and the offering user 132 is more likely to list authentic items.

In operation 550, the network-based system 105 determines that the candidate image provided by the offering user 132 is a copy of an image already within a database and adjusts the rank of the candidate specimen based on this determination. Examples of the database include the product database 115, the image database 116, and the user history database 117. In some example embodiments, a copy identifier may be present within the data of the candidate image, the copy identifier matching another copy identifier present in the data of an image in the database. The network-based system 105 adjusts the rank of the candidate specimen down in response to the copy identifier being present in the candidate image, because a candidate image should not be one that is already in the database, indicating the candidate specimen is potentially a counterfeit.

Continuing with the running shoe example, the offering user 132 may copy the reference image for the "Bolt: Victory Collection" shoe presented in the alert at operation 350 and upload the same image as the candidate image. The network-based system 105 can detect the copy identifier in the data of the candidate image and adjust the rank of the candidate specimen down, because the offering user 132 has not provided an original candidate image and the candidate specimen has a higher likelihood of being a counterfeit.

Figure 6:
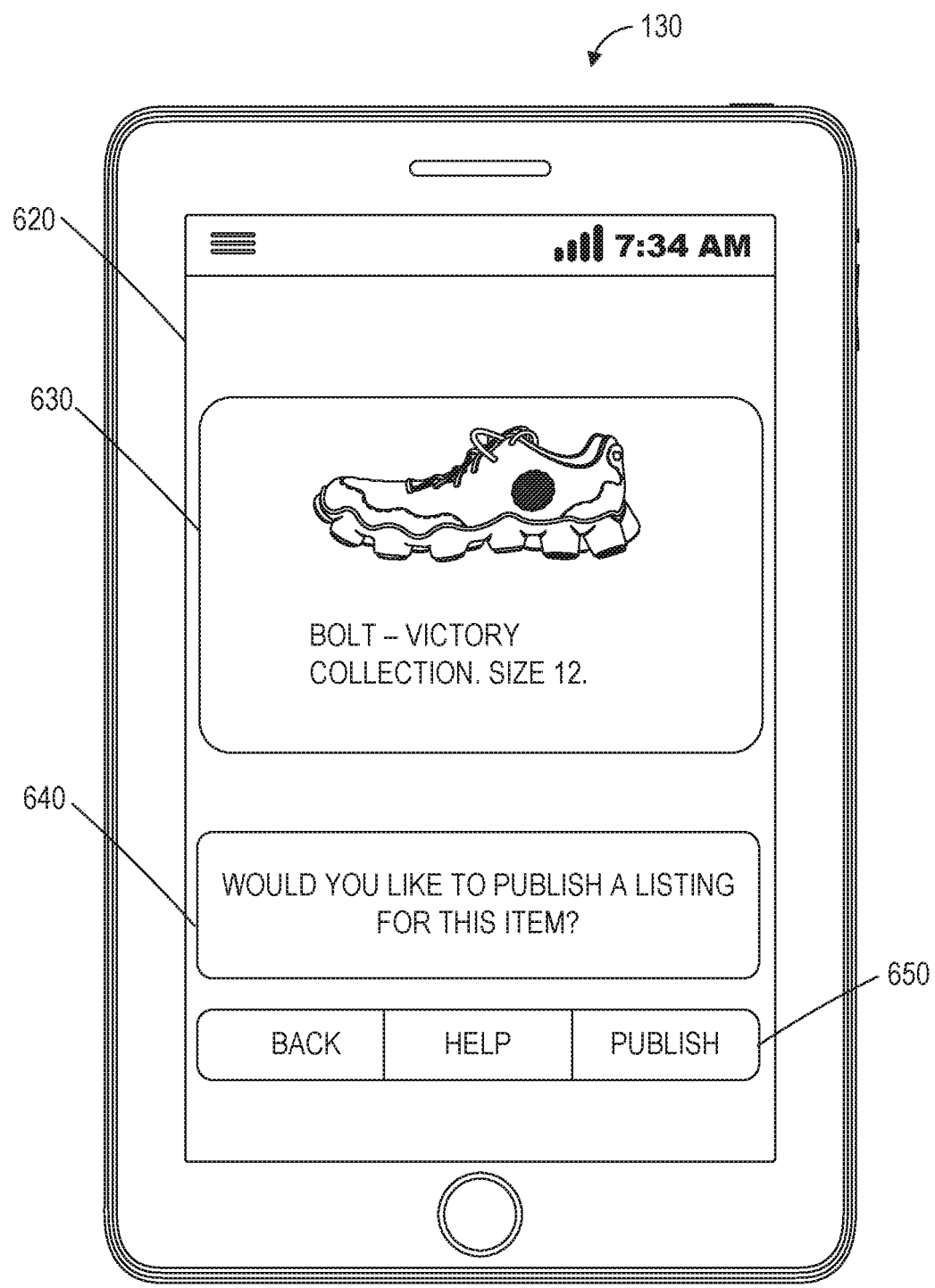
FIGS. 6-9 are illustrations of the device interacting with a user to guide the user in listing a product and providing authenticity support by providing a reference image and a suggestion and guiding the user in submitting a candidate image, according to some example embodiments.

FIG. 6 is an illustration showing an example embodiment of operation 310, where the request receiver accesses the request to publish availability of the candidate specimen of the product item. FIG. 6 additionally continues the previous running shoe example, in which the offering user 132, requests to publish the availability of a specimen (e.g., candidate specimen) of the "Bolt: Victory Collection" product for sale.

In this example, the offering user device 130 is shown displaying a user interface 620, which may be a graphical user interface. Displayed on the user interface 620 in a product window 630 is a sample picture of the product that the offering user 132 wishes to list, as well as a text description of the product. The offering user device 130 may further show a query window 640 that prompts the offering user 132 with a question and an interactive bar 650 that allows the offering user 132 to select an action from among multiple actions. In this example, the interactive bar 650 allows the offering user 132 to select "Publish" to initiate the request to publish the availability of the specimen of the product.

Figure 7:
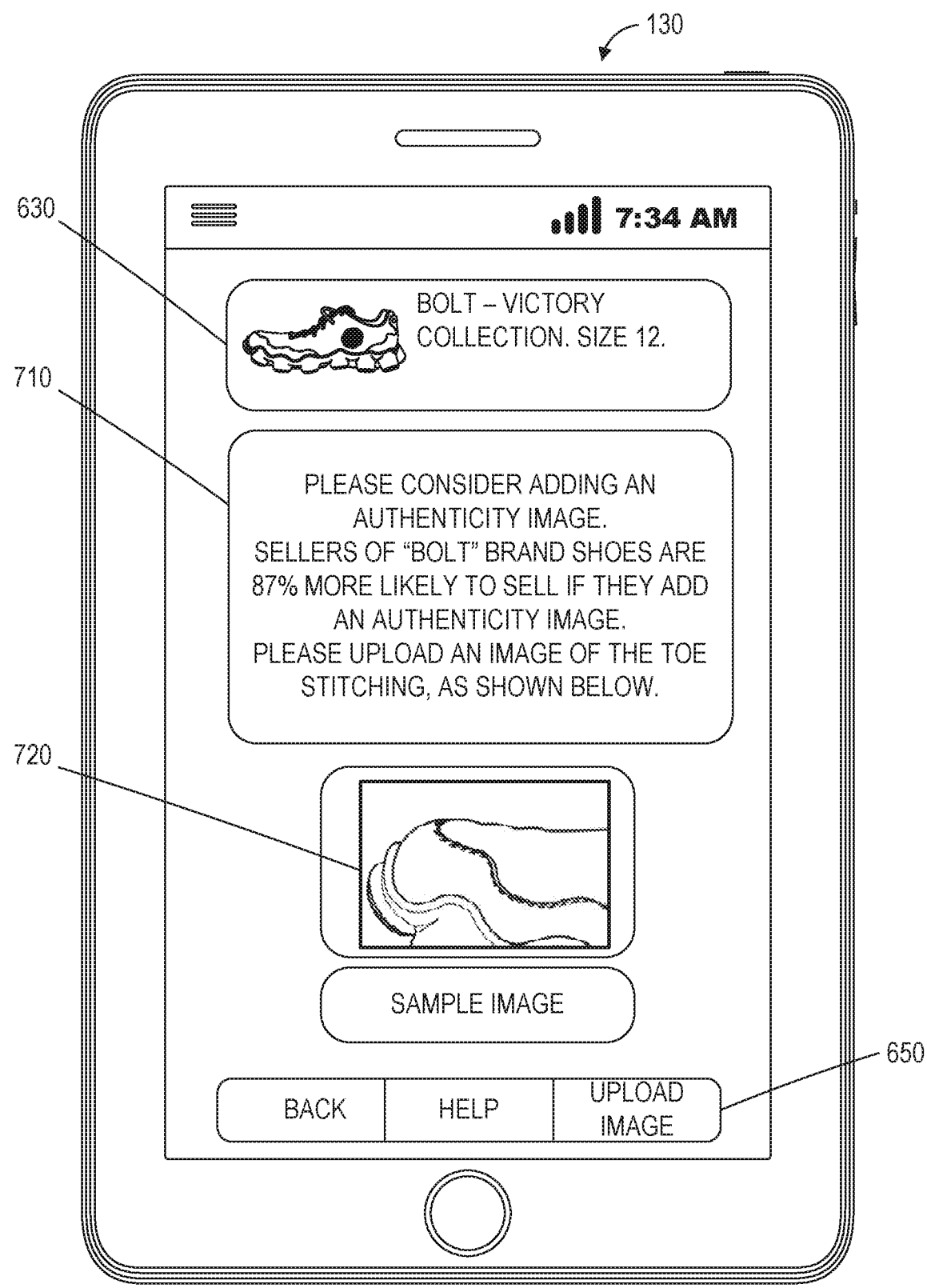

FIG. 7 is an illustration that continues the above example, showing an example embodiment of operation 350 where the offering user 132 is presented with an alert on the offering user device 130, the alert containing a reference image and a suggestion to submit a candidate image. In the example, the product window 630 for the "Bolt: Victory Collection" shoe is still present. In addition, there is a suggestion window 710, containing a suggestion that the offering user 132 include a candidate image. Additionally, a message appears in suggestion window 710 that communicates a benefit of including a candidate image, specifically that "sellers of "Bolt" brand shoes are 87% more likely to sell if they include an authenticity picture."

Additionally, FIG. 7 depicts a reference window 720 containing the reference image that that depicts the "toe stitching" reference detail that fulfills the reference criterion. Finally, the interactive bar 650 has been altered to include an option that says "Upload Image." An offering user 132 can select this option to be presented with a method to upload a candidate image, the method including using an upload form or a secure message.

Figure 8:
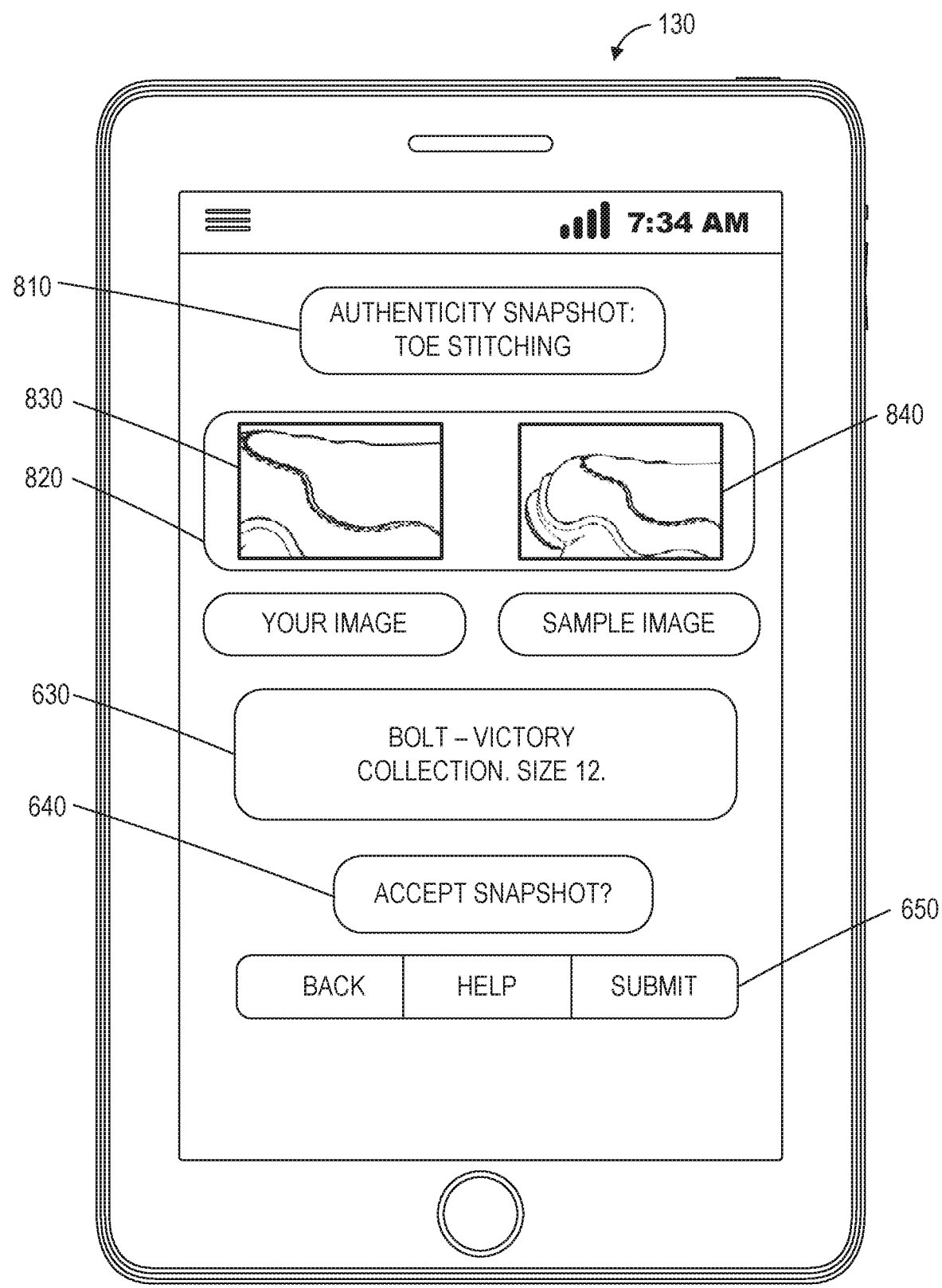

FIG. 8 is an illustration that continues the above example, showing an example embodiment of operation 430 where the reference image and the candidate image are displayed in the same window. Included in the illustration is a title window 810 to communicate to the offering user 132 the reference detail that the candidate image should fulfill, here it is the "toe stitching" detail. Comparison window 820 contains two images, first, the candidate image 830, and second, the reference image 840. These images are presented in the same window so the offering user 132 can easily compare the images and judge whether the candidate detail is adequately shown to fulfill the authenticity criterion. Additionally in this example, the product window 630 has changed to only include text and the query window 640 has changed to ask "Accept Snapshot?" for the offering user 132 to verify that the representation of the candidate detail is adequate. The "submit" button on the interactive bar 650 allows the offering user 132 to accept the upload of the snapshot and continue with the publication of the listing.

Figure 9:
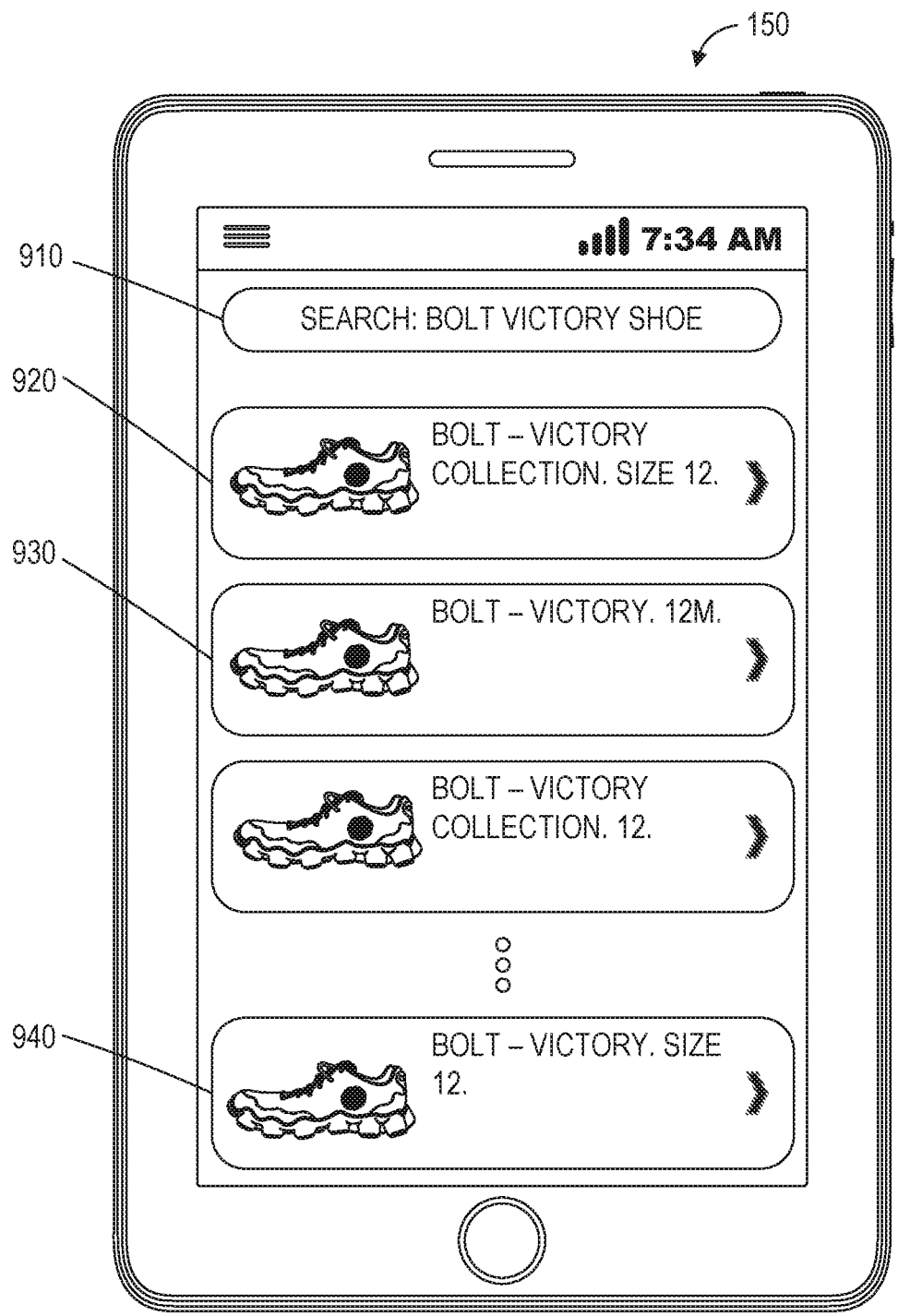

FIG. 9 is an illustration that continues the above example, showing an example embodiment of operation 540 where a rank is adjusted based on the presence of a candidate image. The illustration includes procuring user device 150 that is displayed to the procuring user 152. In the illustration, a first offer window 920 is included with a second offer window 930 and a third offer window 940. In response to a search by the procuring user 152 within the search text box 910, an ordering of offers is presented to the procuring user 152. In this example, first offer window 920 and second offer window 930 are ranked higher than third offer window 940 because the first and second offers include a candidate image whereas the third offer does not include a candidate image. For this reason, the first and second offers receive a higher rank than the third offer and the first offer window 920 and the second offer window 930 receive a higher ordering and are viewed by the procuring user 152 before the third offer window 940.

According to various example embodiments, one or more of the methodologies described herein may facilitate guiding a listing and providing authenticity support. Moreover, one or more of the methodologies described herein may facilitate adjusting a rank of a candidate specimen.

When these effects are considered in aggregate, one or more of the methodologies described herein may obviate a need for certain efforts or resources that otherwise would be involved in guiding a listing and providing authenticity support. Efforts expended by the guided listing machine 110 in guiding a listing and providing authenticity support may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
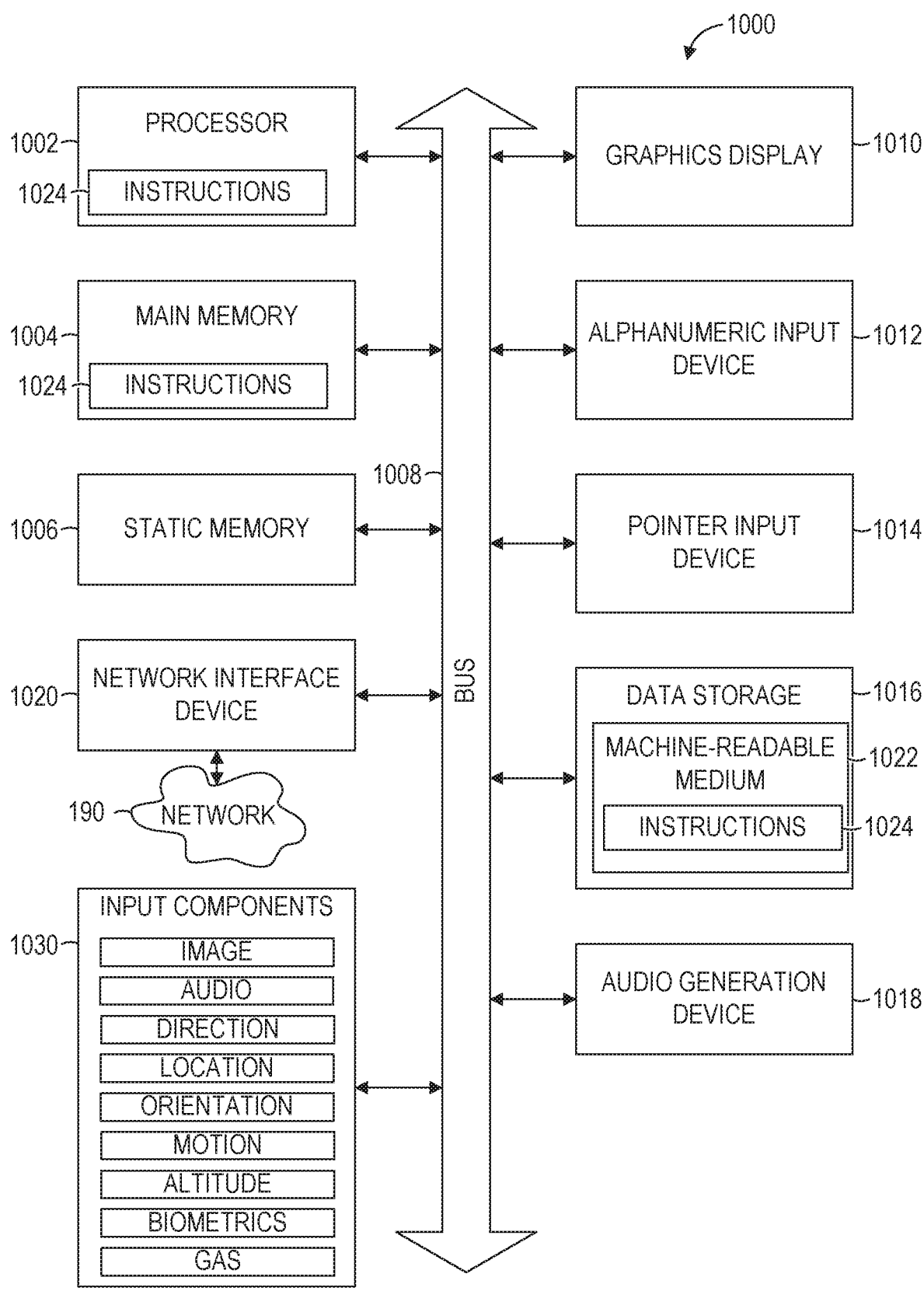
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In other example embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1104, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions

1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1024 for execution by the machine 1000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    one or more hardware processors of a machine; and
    a memory storing instructions that, when executed by one or more of the hardware processors causes the machine to perform operations comprising:
    receiving a request to publish availability of a candidate specimen of a physical item;
    accessing a physical item database that comprises a record that maps an authenticity criterion to an identifier of the physical item, the authenticity criterion describing a reference detail exhibited by a portion of a reference specimen of the physical item and by which the authenticity criterion is fulfillable;
    accessing an image database that comprises a reference image that depicts the portion of the reference specimen of the physical item, the portion of the reference specimen exhibiting the reference detail that fulfills the authenticity criterion mapped to the identifier of the physical item;
    generating a notification that comprises a suggestion that a user submit a candidate image that depicts a portion of the candidate specimen exhibiting the reference detail by which the authenticity criterion is fulfillable;
    causing, on a device, presentation of the notification; and
    adjusting a rank of the candidate specimen among a set of search results based on whether the user provided other candidate images in response to other suggestions.

2. The system of claim 1, wherein the suggestion includes instructions for uploading the candidate image that depicts the portion of the candidate specimen of the physical item exhibiting the reference detail by which the authenticity criterion is fulfillable.

3. The system of claim 1, wherein the suggestion indicates a benefit of uploading the candidate image that depicts the portion of the candidate specimen exhibiting the reference detail by which the authenticity criterion is fulfillable.

4. The system of claim 1, wherein the operations further comprise:
    receiving, from the device, the candidate image that depicts the portion of the candidate specimen.

5. The system of claim 4, wherein the operations further comprise:
    causing, on the device, presentation of a confirmation message that the user has successfully submitted the candidate image.

6. The system of claim 4, wherein the operations further comprise:

causing the device to display the candidate image that depicts the portion of the candidate specimen in a window in which the reference image that depicts the portion of the reference specimen is also displayed.

7. The system of claim 4, wherein the adjusting of the rank of the candidate specimen is further based on the authenticity criterion being fulfilled.

8. The system of claim 7, wherein the operations further comprise:
    detecting an identifier within data of the candidate image, the identifier indicating an image collection to which the candidate image belongs, and wherein the adjusting of the rank is based on the detecting of the identifier within the data of the candidate image.

9. The system of claim 8, wherein the identifier is received from the device that provided the candidate image.

10. The system of claim 8, wherein the identifier is exhibited by picture data of the candidate image.

11. The system of claim 7, wherein the operations further comprise:
    accessing a user history database of the user, the user history database including records of events in which the user provided candidate images in response to suggestions, and wherein the adjusting of the rank is based on the record of events indicating the user provided candidate images in response to suggestions.

12. The system of claim 7, wherein the operations further comprise:
    determining that the candidate image is a copy of any image located within a predefined library of images, and wherein the adjusting of the rank is based on the determining that the candidate image is a copy.

13. A method comprising:
    receiving a request to publish availability of a candidate specimen of a physical item;
    accessing a physical item database that comprises a record that maps an authenticity criterion to an identifier of the physical item, the authenticity criterion describing a reference detail exhibited by a portion of a reference specimen of the physical item and by which the authenticity criterion is fulfillable;
    accessing an image database that comprises a reference image that depicts the portion of the reference specimen of the physical item, the portion of the reference specimen exhibiting the reference detail that fulfills the authenticity criterion mapped to the identifier of the physical item;
    generating a notification that comprises a suggestion that a user submit a candidate image that depicts a portion of the candidate specimen exhibiting the reference detail by which the authenticity criterion is fulfillable;
    causing, on a device, presentation of the notification; and
    adjusting a rank of the candidate specimen among a set of search results based on whether the user provided other candidate images in response to other suggestions.

14. The method of claim 13, further comprising:
    receiving the candidate image from the device; and
    adjusting the rank of the candidate specimen based on the authenticity criterion being fulfilled.

15. The method of claim 14, further comprising:
    detecting an identifier within data of the candidate image, the identifier indicating an image collection to which the candidate image belongs, and wherein the adjusting of the rank is based on the detecting of the identifier within the data of the candidate image.

16. The method of claim 15, wherein the identifier is exhibited by picture data of the candidate image.

17. The method of claim 14, further comprising:
    determining that the candidate image is a copy of any image located within a predefined library of images, and wherein
    the adjusting of the rank is based on the determining that the candidate image is a copy.

18. A non-transitory machine-readable storage device comprising instructions that, when executed by one or more processors of a machine, cause the machine to perform operations comprising:
    receiving a request to publish availability of a candidate specimen of a physical item;
    accessing a physical item database that comprises a record that maps an authenticity criterion to an identifier of the physical item, the authenticity criterion describing a reference detail exhibited by a portion of a reference specimen of the physical item and by which the authenticity criterion is fulfillable;
    accessing an image database that comprises a reference image that depicts the portion of the reference specimen of the physical item, the portion of the reference specimen exhibiting the reference detail that fulfills the authenticity criterion mapped to the identifier of the physical item;
    generating a notification that comprises a suggestion that a user submit a candidate image that depicts a portion of the candidate specimen exhibiting the reference detail by which the authenticity criterion is fulfillable;
    causing presentation of the notification; and
    adjusting a rank of the candidate specimen among a set of search results based on whether the user provided other candidate images in response to other suggestions.

* * * * *